March 21, 1950     G. S. BOHANNON     2,501,595
PLASTIC MOLDING MACHINE
Filed April 14, 1947     5 Sheets-Sheet 1

GEORGE S. BOHANNON
INVENTOR.

BY
*J. Piston Smecker*
HIS ATTORNEY

March 21, 1950 G. S. BOHANNON 2,501,595
PLASTIC MOLDING MACHINE
Filed April 14, 1947 5 Sheets-Sheet 2

GEORGE S. BOHANNON
INVENTOR.

BY
HIS ATTORNEY

March 21, 1950     G. S. BOHANNON     2,501,595
PLASTIC MOLDING MACHINE

Filed April 14, 1947     5 Sheets-Sheet 3

GEORGE S. BOHANNON
*INVENTOR.*

BY

*HIS ATTORNEY*

March 21, 1950

G. S. BOHANNON 2,501,595

PLASTIC MOLDING MACHINE

Filed April 14, 1947

GEORGE S. BOHANNON
*INVENTOR.*

BY

*HIS ATTORNEY*

March 21, 1950

G. S. BOHANNON 2,501,595

PLASTIC MOLDING MACHINE

Filed April 14, 1947

GEORGE S. BOHANNON
*INVENTOR.*

BY
*HIS ATTORNEY*

Patented Mar. 21, 1950

2,501,595

UNITED STATES PATENT OFFICE 2,501,595

PLASTIC MOLDING MACHINE

George S. Bohannon, Fort Worth, Tex., assignor to Crown Machine and Tool Company, Fort Worth, Tex.

Application April 14, 1947, Serial No. 741,403

10 Claims. (Cl. 18—30)

This invention relates to improvements in plastic molding machines, and is an improvement on the subject-matter of my prior application, Serial No. 710,116, filed November 15, 1946.

The plastic molding machine set forth in my prior application was adapted for molding plastic materials, particularly of thermoplastics. Such materials ordinarily are furnished in the form of powder, granular or other solids, and must be heated before the molding operation. According to my invention, the heating of the plastic materials takes place preferably prior to the introduction thereof into the injection chamber, to convert the solid materials into a liquid or plastic condition which liquid or plastic then is introduced into the injection chamber for charging therefrom into the mold.

The object of this invention is to improve the construction of the plasticizing chamber, to improve the heating effect obtained therein on the material, as it passes through the plasticizing chamber to the injection chamber, and to insulate the source of supply of the solid material from the heat of the plasticizing chamber to maintain the source of supply sufficiently cool that the material will be maintained in solid condition until it is introduced into the plasticizing chamber.

According to one embodiment of the invention, the plasticizing chamber may be constructed in a body having an opening therein for the flow of the material through the chamber to the injection chamber. An internal spreader is provided in the body for increasing the length of travel of the material therethrough in a relatively compact body, and provision is made for heating the material as it passes through the plasticizing chamber. It is preferred that electric heating units be used which have been found entirely satisfactory and practical for use. These may be assembled in compact relation, are inexpensive to manufacture and use and effective for supplying heat to the plastic material as it is directed through the chamber. Provision is made in the body for insulating the source of supply from the heat of the plasticizing chamber, as by the incorporation therein of an effective insulation.

This embodiment of the invention is illustrated in the accompanying drawings in which.

The invention is shown as applied to a molding machine generally of the character set forth more in detail in my prior application, Serial No. 710,116, filed November 15, 1946, which is referred to for the general structure of the machine.

Figure 3:
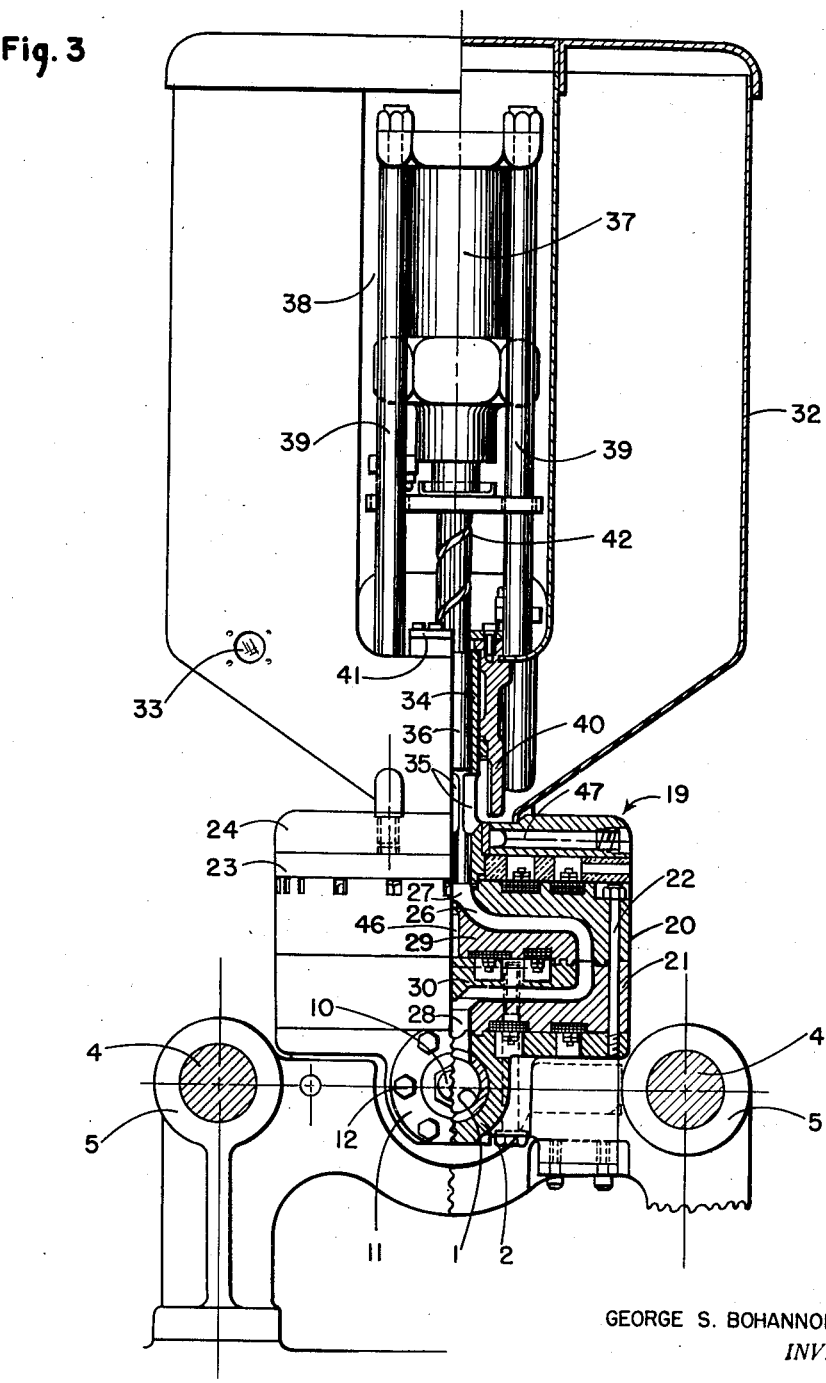
Fig. 3 is a side elevation partly in section, at right angles thereto.

Supported on the base of the machine in any suitable manner is an injection cylinder generally designated at 1, which is shown as formed in a body indicated generally at 2, secured to a bracket 3 which forms a support for the body and cylinder. Extending lengthwise of the cylinder on opposite sides thereof, are tie rods 4, as shown in Figs. 3 and 5, which tie rods extend lengthwise of the bed of the machine and support the mold.

Figure 5:
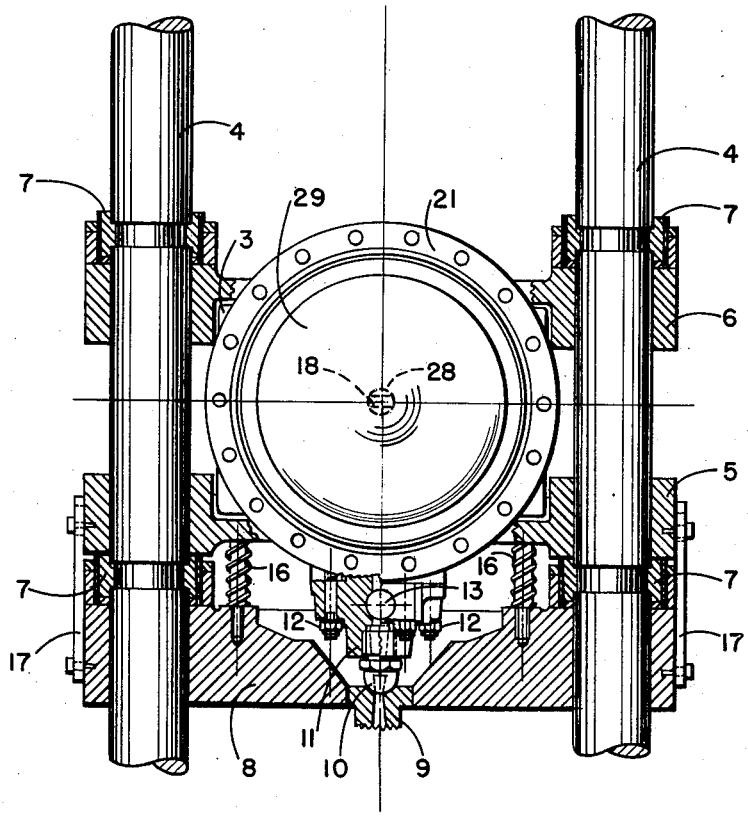
Fig. 5 is a horizontal section therethrough on the line 5—5 of Fig. 4.

Referring to Fig. 5, the tie rods 4 have rigidly secured thereto front and rear support brackets 5 and 6, mounted on the bed of the machine. Each of these brackets is fixed rigidly to the tie rods by thrust collars 7, at opposite ends of the brackets, as shown in Fig. 5. The body 2 of the injection cylinder is mounted between the front and rear support brackets 5 and 6, and is supported and confined thereby, as will be evident from Fig. 5.

The mold is adapted to be mounted adjacent the front end of the nozzle 10 of the injection cylinder 1, between break-away plates, one of which is shown at 8, slidably mounted on the tie rods 4, in position for holding the mold between the plates to receive a charge of material from the injection cylinder. A portion of the mold cavity bushing is shown at 9, in Fig. 5, in complementary relation with an injection nozzle 10, so as to direct a charge of material into the mold cavity.

The injection nozzle 10 is attached to an injection head 11 secured to the forward end of the injection cylinder body 2, by tie bolts 12. A nozzle valve is shown at 13, extending transversely of the passageway that extends from the injection cylinder 1 to the nozzle 10, for the purpose of controlling the feed from the injection cylinder into the mold. This valve 13 is operated in timed relation with the injection plunger 14, so as to close the passageway at the end of the injection stroke, immediately after the position of the injection plunger shown in Fig. 2. The injection plunger 14 has an adapter 15 connected therewith for operating this plunger from a hydraulic power device as described more in detail in my application mentioned above. The valve 13 is also operated by a hydraulic power device as described in said application.

Referring to Fig. 5, the break-away plate 3 is urged away from the front support bracket 5, by coiled springs 16 introduced therebetween. The separating movement is limited by links 17, having slotted pinned connections with the bracket 5.

Surmounted on the body 2 is a plasticizing device adapted to feed plastic material in liquefied form through the injection port 18 in the top of the injection cylinder 1. This plasticizing device is shown as comprising a body generally indicated at 19, seated and secured upon the upper face of the injection cylinder body 2, which has a flared upper portion and face, as shown in Figs. 4 and 6.

The plasticizing body 19 preferably comprises upper and lower body sections 20 and 21, respectively, tied together and to the body 2, by tie bolts 22. Superposed on the section 20 is a sheet of heat insulation 23, held in place by a top plate 24. Machine screws 25 extend through the top plate 24, and the sheet of insulation 23, into the top section 20 for detachably connecting these parts together.

Figure 4:
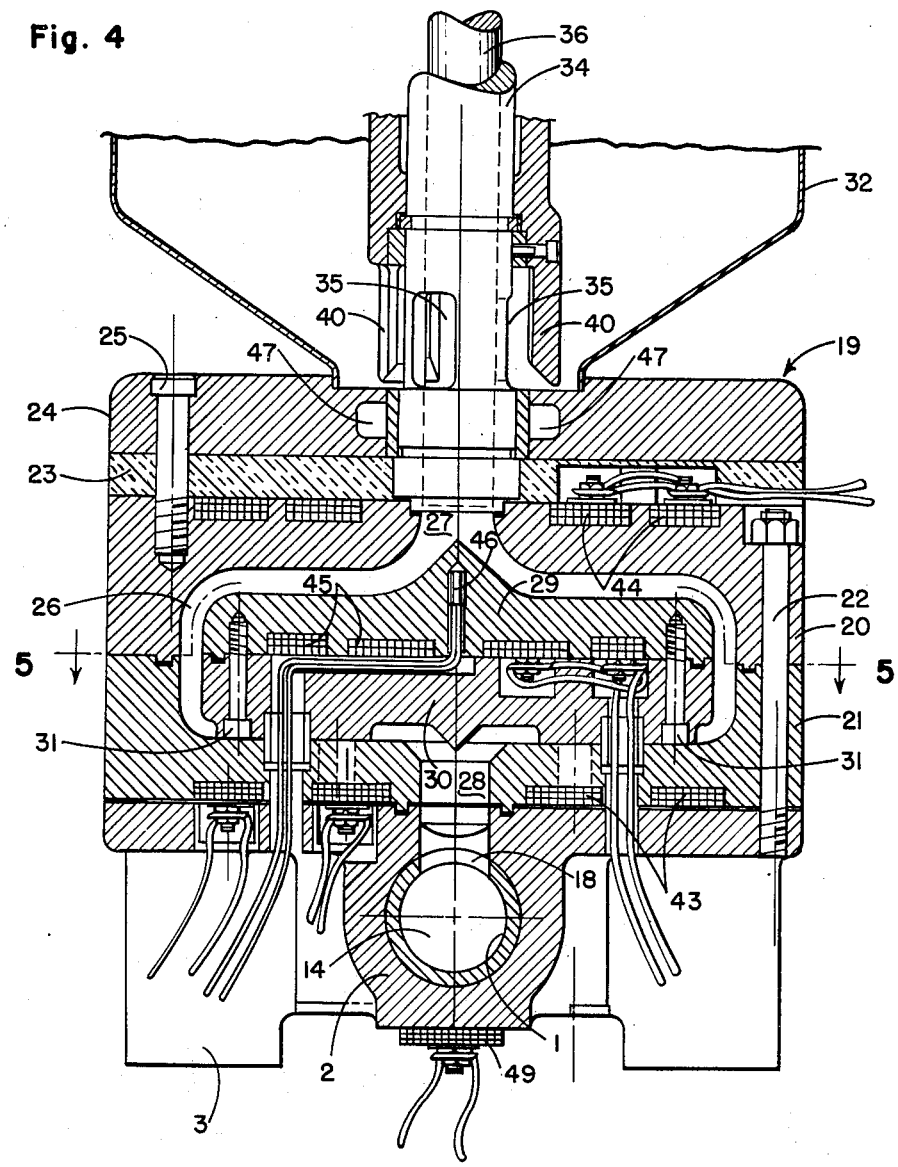
Fig. 4 is an enlarged cross section through the plasticizing chamber.
Figure 6:
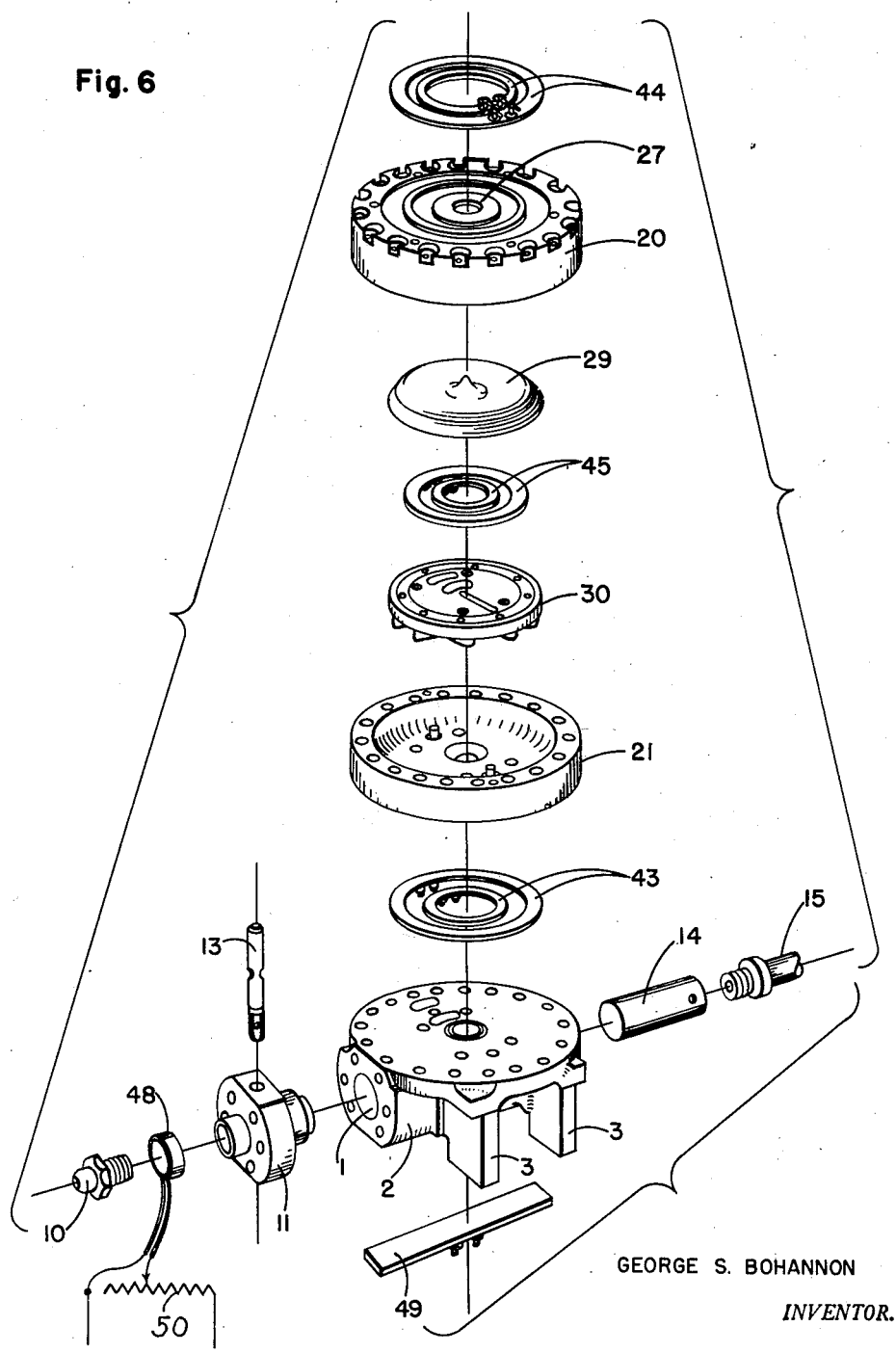
Fig. 6 is a disassembled perspective view of the principal parts of the plasticizing and injection chamber.

The body sections 20 and 21, which are hollowed out as shown in Figs. 4 and 6, fit together in complementary relation to form a chamber 26. A spreader, formed by upper and lower members 29 and 30 which members are secured together by bolts 31, is mounted within the chamber 26 and acts as an internal core to define a chamber that is substantially of uniform width and comparatively thin so as to subject the granular plastic material therein to the correct amount of heat transfer from heating elements 44 and 45.

An inlet port 27 at the upper side of the body section 20, admits granular plastic into the upper center of the chamber 26, where it contacts the spreader 29—30, which spreader causes the granular plastic to spread radially in all directions from the inlet port 27 in a uniform layer outwardly and downwardly about the spreader, which material is heated quickly by properly positioned heating elements 44 and 45.

I have found by actual experiment that the rapidly increased cross-sectional area of the chamber 26, without enlargement of the width of the passage or chamber 26, is obtained by the chamber leading out at right angles to the inlet port 27. Therefore, the cross-section area of the chamber at any given diametrical point is 3.1416 times the diameter of the chamber at that point, times the width of the chamber at any given point.

In this manner, the maximum increase in cross-sectional area of the chamber 26 is secured without increasing the width of the passage formed within the chamber by the body 20—21 and the spreader 29—30. As the granular plastic is fed into the chamber 26 it is forced radially outward from the inlet port 27, over spreader 29—30, and is heated quickly during this spreading process by the presence of the heating elements 44—45, whereby the plastic will attain sufficient plasticity to flow to the annular portion of the chamber 26.

The annular portion of the chamber 26 is substantially the same width as at any other cross-sectional point. The plastic material, having reached this portion of the chamber, is still subject to heat, and therefore, the liquidity is increased and the material flows laterally inward from the annular portion of the chamber, and is subjected to further heat by the heating element 43 as it passes to the outlet port 28.

The passage of the material through the chamber and between the heating elements has been so arranged that the material has reached the desired state of liquidity at this point, for introduction through the oval port 18, into the cylinder 1, under pressure of the piston 36. The reduced outlet port 28 in the bottom of the chamber 26 registers with the oval inlet port of the injection cylinder 1.

The efficiency of the plasticizing chamber is increased in direct proportion to the angle of divergence of the chamber to the inlet port until it reaches the maximum of 180°, at which point it reaches the maximum efficiency. The maximum amount of heat transfer and the maximum degree of fluidity of the material within the chamber is obtained by giving the chamber the most rapid increase in cross-sectional area without enlarging the width or depth which is the arrangement shown. This allows for the rapid passing and quick heating of the plastic material and this is a distinct advance in the art over the methods used heretofore.

The material is supplied to the plasticizing chamber from a hopper generally indicated at 32, carried by the top plate 24, and which hopper is adapted to contain the thermoplastic material in granular form. Any suitable form of material adaptable for the purpose may be used as desired, such as cellulose acetate, polystyrene, methacrylate, etc. The quantity of material contained in the hopper may be observed by the operator through a window 33 provided in a side thereof.

Figure 1:
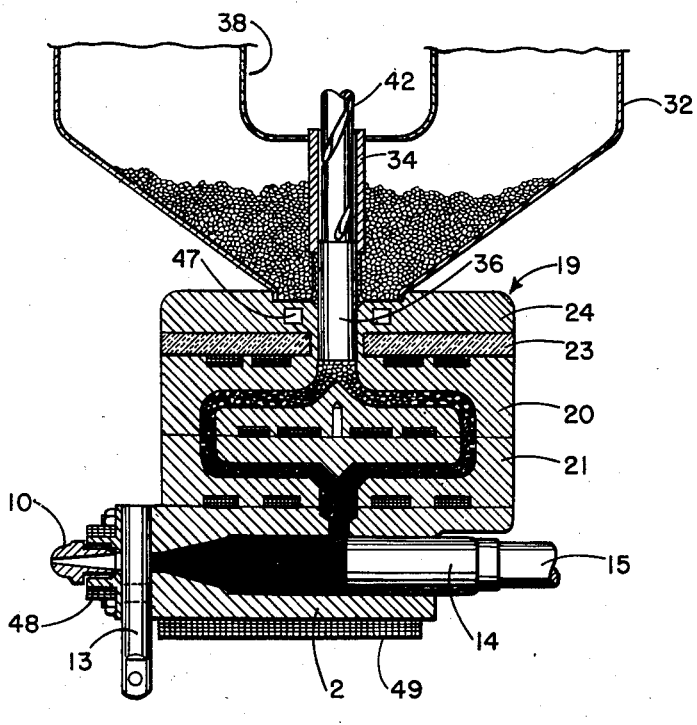
Fig. 1 is a vertical sectional view through the injection and plasticizing portions of the molding machine, showing the charging plunger in one position.
Figure 2:
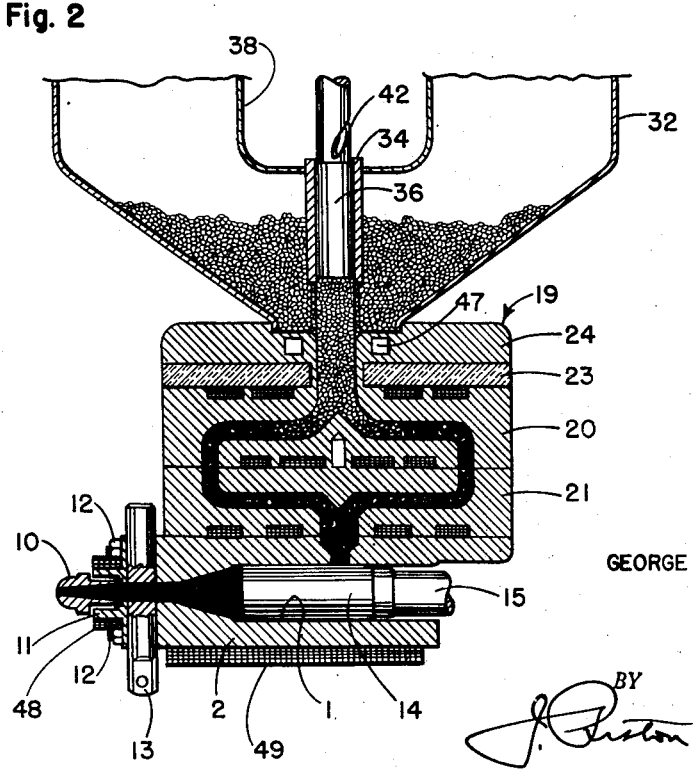
Fig. 2 is a similar view in the opposite position thereof.

The hopper 32 is provided with an upright sleeve 34 in the center thereof, at the bottom, having slots 35 in the lower end portion thereof, open to the interior of the hopper 32, as shown in Figs. 3 and 4. Within the sleeve 34 is mounted a feed plunger 36 adapted to be lowered to the entrance opening 27 of the plasticizing chamber, as shown in Fig. 1, or to be raised relative thereto, to receive a charge of material, as shown in Fig. 2.

The feed plunger 36 is operated by a hydraulic power device generally indicated at 37, in Fig. 3, mounted within a central opening 38, provided in the hopper 32. This power device 37 is mounted on support rods 39, that extend upright in the opening 38.

An agitator 40 surrounds the sleeve 34, and has depending fingers on the lower end thereof, spaced outward from the slots 35 in the bottom of the hopper 32. This agitator 40 has a cap portion 41, provided with a lug engaging in a helical groove 42, formed in the surrounding face of the plunger 36, to rotate the agitator 40 upon vertical sliding movement of the plunger, to facilitate the feeding of the material from the hopper through the slots 35 to the entrance opening 27 of the plasticizing chamber.

The plasticizing chamber is adapted for heating of the material as it flows downward therethrough under the pressure of the feed plunger 36. It is preferred that electrical heating units be used for the purpose, one set of which is provided in the form of electric heating rings shown at 43 (Figs. 4 and 6) inserted in grooves in the bottom face of the body section 21. Corresponding rings 44 are shown in the top face of the body section 20. A set of electric heating rings 45 is provided also within the spreader 29—30, between the facing sides thereof, as shown in Fig. 4. Suitable connections are provided through orifices in the plasticizing body 19 for connecting these respective heating rings 43—45 with a source of electrical supply, as indicated generally in Fig. 4. A temperature controlling thermocouple may be provided if desired within the plasticizing chamber or the spreader 29—30, as indicated at 46 in Fig. 4.

The heat from the plasticizing chamber may be confined thereto against heating of the material in the hopper 32, by the sheet of insulation 23. The top plate 24 may be provided with cooling means, if found desirable, as by a cooling water passage indicated at 47 therein, suitable connections being provided thereto, as indicated in Fig. 3, for the circulation of cooling water through said water passage.

Additional heating coils may be used as desired, one of which is shown at 48, surrounding the nozzle 10, and another provided beneath the body 2, as indicated at 49. The heating coils 48 and 49 will serve to maintain the heated and fluid condition of the material during its charging action into and through the injection chamber and injection nozzle. A rheostat 50 is connected in series within the circuit of the nozzle heater unit 48 to enable the varying of the heat of heater element 48 so as to control the fluidity of the plastic being injected into the mold 9.

In the operation of the machine, the material normally is confined within the hopper 32 and is fed therefrom into and through the plasticizing chamber 26, by the reciprocating movement of the plunger 36, between the positions shown in Figs. 1 and 2.

When the injection plunger 14 is withdrawn to the position shown in Fig. 1, the gate or valve 13 will be closed, in which position the mold is closed ready to receive a charge of material. As the material is fed down through the plasticizing chamber 26, it will be transformed from solid substantially to liquid plastic material in which condition it is introduced into the injection cylinder 1 to fill this cylinder between the plunger 14 and the gate or valve 13. Then, in properly timed relation, the valve 13 will be opened as shown in Fig. 2, and the plunger 14 moved forward to charge the material in the mold, after which the injection plunger is withdrawn and the valve closed.

The plasticizing of the material in the separate plasticizing chamber out of the injection chamber has been found to be a material improvement in the art, making it possible for the machine to use a very low pressure applied to the injection plunger, thereby reducing the cost of the machine very materially, but with greatly improved efficiency. For instance, it has been found that for one size of machine, a pressure of 4200 pounds per square inch may be used on the injection plunger with a reduction in pressure at the injection nozzle of less than three per cent relative to the pressure there applied. a very marked improvement in injection molding machines of this character.

The passages of the plasticizing chamber are not enlarged in the sense of becoming wider, but the width of the passage is maintained relatively narrow (5/8", as an example), which is sufficiently narrow for the heat from the heating elements to heat the plastic passing therethrough quickly, so that the plastic being liquefied as it travels outward creates no back pressure on the incoming granular plastic.

By using the spreader in this particular type of plasticizing chamber 26, actual molding can be accomplished by the pressure from the single piston 36. A machine utilizing a plasticizing chamber of this nature and which uses only one piston would be many times more efficient than the machines in use heretofore.

While the invention has been illustrated and described in one embodiment, it is recognized that variations and changes may be made therein, without departing from the invention, except as specified in the claims.

I claim:

1. In a pre-plasticizing unit adaptable for use with a plastic molding machine, a reservoir adapted to hold a supply of divided thermoplastic solids, a housing assembly having a portion defining a feed passage adapted to receive such solids from the reservoir, a feed member and means for moving it along said feed passage, a spreader plate defining, with another portion of the housing assembly, a substantially unrestricted plasticizing passage of generally uniform width extending generally at right angles to the path of said feed member, said housing assembly having portions defining a discharge passage extending from the periphery of said plasticizing passage and terminating in a relatively restricted outlet passage adapted for connection to the injection cylinder of a molding machine, and means for heating the material passing between the spreader plate and housing adequately to complete the substantial plasticization of the solids during their passage from the feed passage to the discharge passage.

2. The structure of claim 1, characterized by and including a plunger and means for guiding it through a stroke in part of which it is withdrawn from the feed passage whereby, upon such withdrawal of the plunger, solids in the container are free to enter the feed passage for movement by the plunger, upon its return stroke, along the feed passage and against the spreader plate.

3. The structure of claim 1 characterized by and including a spreader plate having supporting means connected to the side of the plate opposite to the side which faces the feed passage, the plate having an unobstructed circumferential edge generally concentric with such feed passage.

4. The structure of claim 1 characterized by and including a housing assembly including a plurality of opposed sections defining a cavity and a spreader plate positioned in said cavity, the spreader plate having a central projection aligned generally with the axis of the feed passage and supporting connections between the plate and the surrounding housing assembly, such connections being located beyond the circumferential edge of the plate, in relation to the flow of the thermoplastic material across the face of the plate opposed to the feed passage.

5. The structure of claim 1 characterized by and including a housing assembly including a plurality of opposed sections defining a cavity and a spreader plate positioned in said cavity, supporting connections between the plate and the surrounding housing assembly, such connections being located beyond the circumferential edge of the plate, in relation to the flow of the thermoplastic material across the face of the plate opposed to the feed passage.

6. The structure of claim 1 characterized by and including a reservoir in the form of a hopper positioned above the pre-plasticizing unit, the feed passage being in communication with the interior of the hopper, and a plunger and means for guiding it through a stroke in part of which it is withdrawn upwardly from the feed passage into the hopper whereby, upon such withdrawal of the plunger, solids in the hopper are free gravitally to enter the feed passage for movement by the plunger, upon its return stroke, along the feed passage and against the spreader plate.

7. The structure of claim 1 characterized by and including a multi-part housing assembly having parts defining a cavity, a multi-part spreader plate located in said cavity, supporting connections between said spreader plate and the housing assembly located at the side of said plate opposite to the feed passage, and means for removably securing said housing and plate parts together.

8. The structure of claim 1 characterized by and including a housing assembly having a generally vertically axised feed passage in an upper portion thereof and an aligned restricted outlet passage in a lower portion thereof, and an injection cylinder body secured to a lower portion of the housing assembly and underlying and being adapted to support the housing assembly and the reservoir for the thermoplastic solids.

9. The structure of claim 1 wherein the spreader plate is provided with a substantially centrally disposed conic projection directed towards said feed passage.

10. The structure of claim 1 wherein the spreader plate is provided with a substantially centrally disposed conic projection directed towards said feed passage, and wherein the conical wall of said projection merges at the base thereof with the surface of the spreader plate over which said thermoplastic material moves.

GEORGE S. BOHANNON.

REFERENCES CITED

The following references are of record in the file of this patent:

UNITED STATES PATENTS

| Number | Name | Date |
|---|---|---|
| 2,057,945 | Gastrow | Oct. 20, 1936 |
| 2,202,140 | Burroughs | May 28, 1940 |
| 2,266,729 | Anderson | Dec. 23, 1941 |
| 2,268,026 | Ernst et al. | Dec. 30, 1941 |
| 2,362,469 | Cousino | Nov. 14, 1944 |
| 2,367,144 | Shaver | Jan. 9, 1945 |
| 2,370,882 | Smith | Mar. 6, 1945 |
| 2,390,266 | Novotny | Dec. 4, 1945 |